United States Patent [19]
Canfield

[11] 4,233,837
[45] Nov. 18, 1980

[54] APPARATUS FOR MEASURING TENSION IN A LINEAR MATERIAL

[75] Inventor: Sheldon A. Canfield, Newark, Ohio

[73] Assignee: Owens-Corning Fiberglas Corporation, Toledo, Ohio

[21] Appl. No.: 10,442

[22] Filed: Feb. 8, 1979

[51] Int. Cl.³ .............................................. G01L 5/10
[52] U.S. Cl. ................................................. 73/144
[58] Field of Search ............... 73/144, 141 A, 133 R, 73/765, 766; 177/211

[56] References Cited

U.S. PATENT DOCUMENTS

| | | | |
|---|---|---|---|
| 3,280,623 | 10/1966 | Saxl | 73/141 A |
| 3,376,740 | 4/1968 | Harvey | 73/144 |
| 3,398,581 | 8/1968 | De Lucia | 177/211 |
| 3,526,130 | 9/1970 | Canfield | 73/144 |

FOREIGN PATENT DOCUMENTS

1082748  6/1954  France ..................... 13/141 A

*Primary Examiner*—Charles A. Ruehl
*Attorney, Agent, or Firm*—Ronald C. Hudgens; Patrick P. Pacella; Paul T. Kashimba

[57] ABSTRACT

An apparatus for measuring tension in linearly extended flexible material. The apparatus comprises: a support means; a first member having one end attached to the support means; means associated with the first member for engaging tensioned material to impart a bend thereto, thereby causing strain in the first member, such strain being produced by first and second moments, with the first and second moments being separate moments; and means associated with the engaging means for sensing the strain caused in the first member by only the first moment and for generating a signal responsive thereto as an indication of the tension in the material.

14 Claims, 11 Drawing Figures

APPARATUS FOR MEASURING TENSION IN A LINEAR MATERIAL

BACKGROUND OF THE INVENTION

The present invention relates to an apparatus for measuring tension in a linear material and more particularly relates to an apparatus for measuring tension in a traveling linear material and which may include means responsive to such measured tension for keeping a substantially constant tension on the material.

It is possible to arrange apparatus for measuring tension in a linear material into two categories, direct and inferential. Direct tension measuring apparatus directly measures tensile force in a linear material. Inferential measuring apparatus infers tension in a linear material from properties and relationships of the material that can be related to the tension in a material.

A tension measuring apparatus is particularly useful in making glass fibers especially in a process for forming a continuous glass filament where such filaments are attenuated from streams of molten glass provided from a supply of molten glass. Suitable means gathers the filaments into a strand which are collected by suitable winding or advancing means at speeds from several thousand to ten thousand or more feet per minute. Variations in linear speed of the advancing strand or filaments changes the tensile force in the material, such variations affecting the diameter of the filaments themselves as they are attenuated from streams of molten glass. Tension measuring devices are used to measure the tension in a material and responsive to that measured tensile force modulate process conditions to keep the tensile force in the advancing linear material such as glass strands substantially constant so more uniform filament diameters are produced.

An improvement in tension measuring devices is shown in U.S. Pat. No. 3,526,130 issued Sept. 1, 1970, and assigned to the common assignee of this application.

In that device, the tensile force in a linearly extended material is measured as a function of the strain induced by the linear material. More particularly, the traveling flexible material, such as glass fiber, is bent a predetermined angle to induce a rotational force or moment about a cantilevered arm which is supported at one end. According to the relationship shown in the U.S. Pat. No. 3,526,130, the transducers are placed at a predetermined location on the arm such that the strain induced in the transducer by the force of a material as it bends against the apparatus is directly related to the tensile force in the material.

However, in accordance with the relationship shown in that prior art patent, the path of the material must be toward and intersect with that same location on the cantilevered arm where the transducers are mounted. For practical reasons, a second turn is imparted to the material after the bend so a colliding intersection with the transducers is avoided. The path of the material is then diverted around the transducers to the take up reel or winder.

SUMMARY OF THE INVENTION

This device is an improvement over the apparatus shown in U.S. Pat. No. 3,526,130. As stated above, that device is used to measure tension in a linearly traveling material. A requirement of that device was that the lineally traveling material be bent through an angle and against a cantilevered member. The force imparted by the material as it is bent induces a bending force in transducers such as strain transducers, located on the cantilevered arm providing an indication of that bending force.

In the prior art, to obtain a signal relating the strain to the tensile force in the material, it was necessary to place the transducer at a location on the cantilevered arm corresponding to the given angle of the turn with the result that the path of the material intersected with the transducer location. The path of the material additionally had to be centered with respect to a principle axis along the length of the cantilevered arm called the neutral axis so that no torsional force was placed on the cantilevered arm and the signal produced by the strain transducers would be a pure signal related only to a single moment force about an axis passing through the cantilevered support and perpendicular to the plane described by the path of the material.

As the prior art required that the path of the material be centered with respect to the longitudinal or neutral axis through the cantilevered arm, the path of the material had to be turned a second time so the material would not intersect with and collide with the location on the cantilevered arm corresponding to the location of the transducers.

This invention provides an advantage over the prior art by using an increased number of transducers on the cantilevered arm to derive a strain signal for the bending moment separate and distinct from the torsional strain signals, while increasing the sensitivity of the device to the measured tension. A novel connection of the transducers produces a pure signal related only to the moment about the axis through the support, separate and independent from any signals generated in the transducer by any torsional moments caused by the path of the material being off center with respect to the neutral axis of the cantilevered arm. With these improvements, the linear material need not be centered on the neutral axis of a cantilevered arm but may be mounted to either side of the neutral axis simplifying the installation of the device as well as the accuracy of the device, especially where the path of the material may shift off center in continuous use.

Additionally, the linear material is bent through a single angle and then may proceed in a straight line to the winding apparatus without the need for a second turn against a second support and through a second angle to avoid the intersection with the cantilevered arm supporting the transducers. This provides the advantage of avoiding a second abrasive surface as well as offering a device that is easier to string and place in use.

The device may be used in a permanent installation. In this case, an operator drawing a filament or a strand composed of a number of filaments would string the apparatus by bringing the filaments against the first bearing surface, turning the filaments through the prescribed angle towards the winding apparatus so that the bend imparted to the material would force the material against the apparatus, providing a bending moment to the apparatus and an indication of the tensile force in the material.

Additionally, a portable device may be constructed wherein an operator would hold a device against the strand of filamentary material and position it so that the material was bent through the prescribed angle and a corresponding reading of tensile force could be taken.

In this regard a mark could be placed on the instrument for use in aligning the linear material.

The present invention is particularly useful in making glass fibers, especially in a process for forming continuous glass filaments where such filaments are attenuated from streams of molten glass provided from a supply of molten glass. Suitable means gather the filaments into a strand which are collected by suitable winding or advancing means at speeds from several thousand to ten thousand or more feet per minute. Variations in linear speed of the advancing strand (filaments) changes the tensile forces in the material, such variations affecting the diameter of the filaments themselves as they are attenuated from the streams of molten glass. The method and apparatus of the invention can be used with means responsive to the measured tensile forces acting to modulate process conditions to keep the tensile forces in the advancing linear material such as glass strands or filaments substantially constant for a more uniform filament diameter.

DESCRIPTION OF THE PREFERRED EMBODIMENT

The principles of this invention are described with reference to the following embodiments and should not be thought of as being limited by the embodiments disclosed.

The manner of use of this device and the principles of its operation are substantially shown in U.S. Pat. No. 3,526,130. As described in that patent, and with reference to FIG. 1a, 1b and 1c an advancing strand 1 passes across a unit 10 measuring tensile force in the strand 1. The tension measuring unit 10 includes two cooperating intersecting and connected longitudinal members or legs 11 and 12. The legs 11 and 12 are joined in an angular relation at an end region 14. A securing block 13 fixes the transducer arrangement 10 and particularly, longitudinal leg 12 is cantilevered in support 13. The leg 11 substantially at right angles to leg 12 has a means 15 for engaging the strand 1 as it is bent about the means 15.

Figures 2A, 2B, 2C:
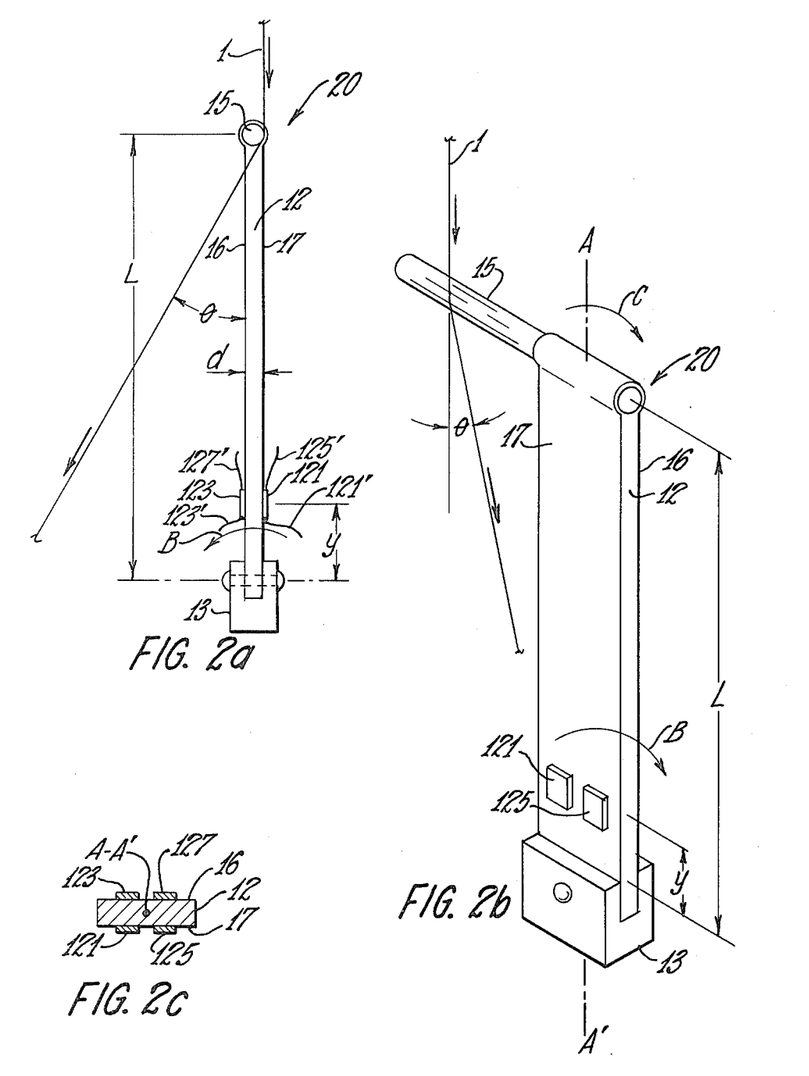
FIGS. 2a and 2b are a side view and a perspective view of a modified form of the apparatus according to the principles of the invention.
FIG. 2c shows the device of FIGS. 2a and 2b in cross section.

In particular, the means 15 on leg 11 is arranged to contact a strand 1 in order to indicate the tension of that strand. The means for contacting the strand 1 may be a turning surface such as the rod 15 having a graphite surface and laterally extending arms 15', 15" connected to center section 15''' as shown in FIG. 2a. The advancing strand 1 turns on the rod 15 at portion 15', 15" or middle portion 15''' as it travels across the measuring unit 10. The rod 15 may be rotating or nonrotating as desired. Graphite may be used on the surface of the rod because of its low abrasion to glass, particularly wet glass. The leg 11 can be of a sturdy rigid material such as a metal or a plastic.

The cantilevered arm 12 is more flexible than leg 11 and the force acting on the transducer arrangement 10 due to strand 1 bent against the rod 15 produces a bending moment against the cantilevered arm 12 as shown by arrow B.

The cantilevered arm 12 has a longitudinal or neutral axis shown as A—A'. In addition to the first bending moment B about the support 13, the location of the material 1 along rod 15, at a location, off center from the longitudinal axis or neutral axis A—A' of the cantilevered arm 12 induces torsional forces against the cantilevered arm, twisting the cantilevered arm by a moment shown as C or C' about the longitudinal axis, A—A' depending on which side of the neutral axis the linear material is located. As can be seen from inspection, where the strand 1 is aligned against the bearing rod 15 at its exact center 15''', and in exact alignment with the neutral axis or longitudinal axis A—A' of the cantilevered arm 12, no torsional forces will result and the only force acting on the cantilevered arm 12 will be bending moment B, passing through the neutral axis A—A'.

Figures 1A, 1B, 1C:
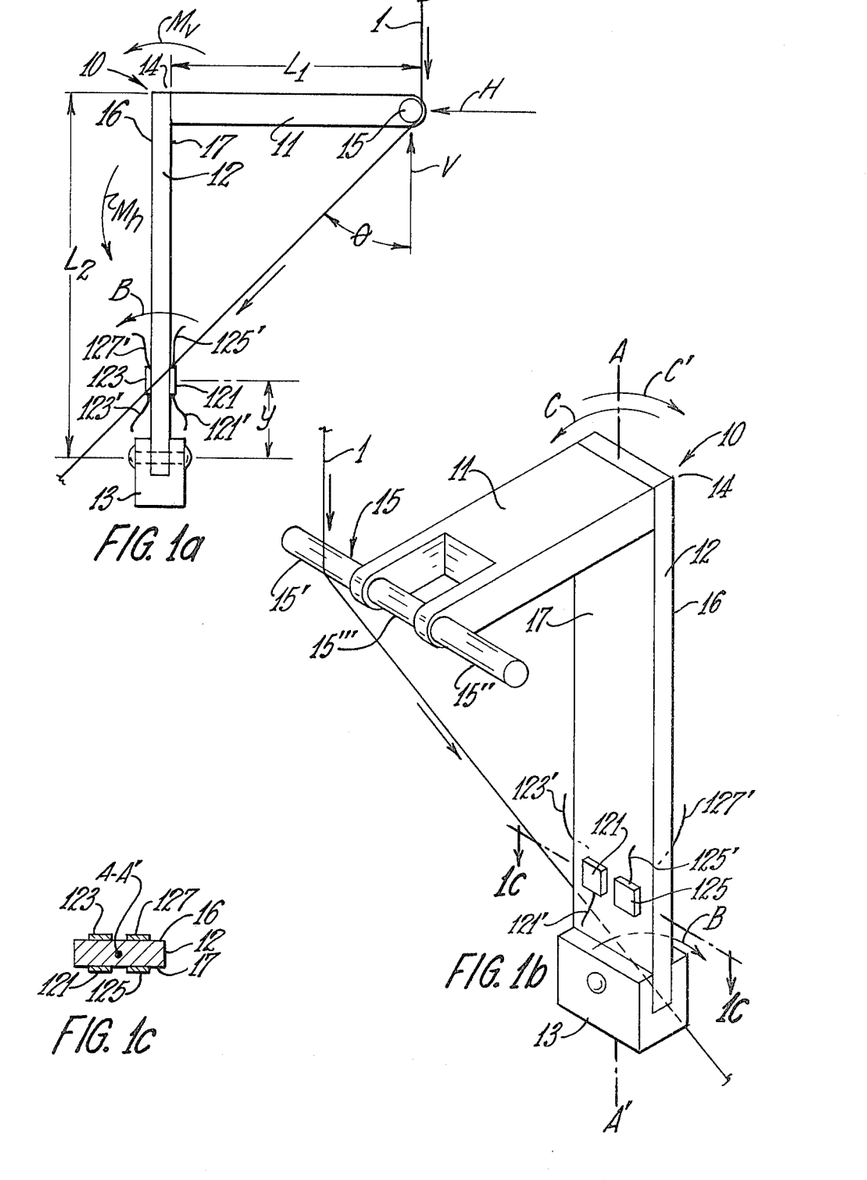
FIG. 1a shows a side view of the device according to the principles of this invention.
FIG. 1b shows a perspective view of the device of FIG. 1, according to the principles of the operation.
FIG. 1c shows the device of FIGS. 1 and 2a in cross section.

A plurality of transducers are mounted on surfaces 16 and 17 of cantilevered arm 12. As shown in FIGS. 1a, b and c transducer 121 and 123 are mounted opposite each other on respective sides 17 and 16. As shown in perspective view 1b, a transducer 125 is mounted on surface 17 of cantilevered arm 12 and symmetrically located with respect to transducer 121 and the longitudinal neutral axis A—A' of the cantilevered arm 12.

A further arrangement of the transducers is shown in FIG. 1c by means of a sectional view wherein the arrangements of the transducers can be more clearly seen with transducers 121 and 123 displaced opposite each other on opposite respective faces 17 and 16 of the arm 12, transducers 125 and 127 similarly displaced opposite each other on respective faces 17 and 16 of arm 12 and with transducers 121 and 125 arranged symmetrically with respect to the neutral axis A—A' and transducers 123 and 127 arranged symmetrically with respect to the neutral axis A—A'. Leads 121', 123', 125' and 127' are provided for making electrical connections to each transducer.

The material 1 is bent through an angle as it is turned against the bearing surface of rod 15. The angle through which the material is bent, may be controlled by positioning of the winder (not shown).

An alternate arrangement is shown in FIGS. 2a and b which is discussed in detail in the following.

The transducers 121, 123, 125 and 127 are mounted in a location referred to as the Tensile Force Indicator Location (TFIL). As shown in FIGS. 1a, b and c the path of the material 1 after it is bent against rod 15 must be directed towards that Tensile Force Indicator Location, and the continuation of that path, at least in one dimension as shown by side view 1, must intersect with that location.

However, consistent with the principles of this invention, the location of the material may be such that it is off center from the neutral axis A—A' of the cantilevered arm 12 and may be directed toward the TFIL shown by the transducers 121 through 127 but pass by it without physically intersecting with the arm or the tensile force transducer location.

In the prior art, the plane described by the path of the linear material 1 passes through the neutral axis A—A', and intersects with the plane defined by the bounds of the transducers 121, 123, 125 and 127, at a right angle, thereby avoiding a torsional moment C about axis A—A'. In this invention, the plane described by the path of the filament or strand need not pass through the neutral axis A—A' nor even intersect with the plane described by the bounds of the transducers 121, 123, 125, and 127 on leg 12. The novel and inventive features of this invention will produce a signal responsive only to the moment B and uncontaminated by the torsional moment C.

Figure 3:
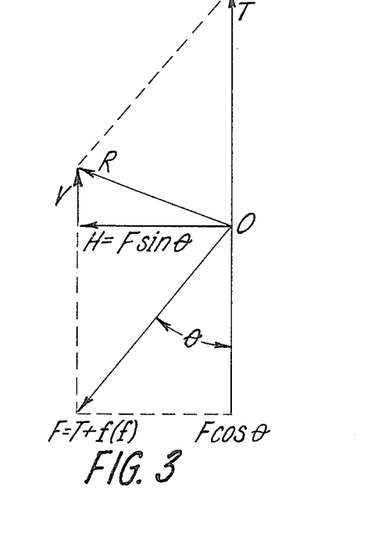
FIG. 3 is a vector diagram showing both tensile forces in a linear material turned on a surface through an angle and the forces acting on such surface because of the turning of the material.
Figure 4:
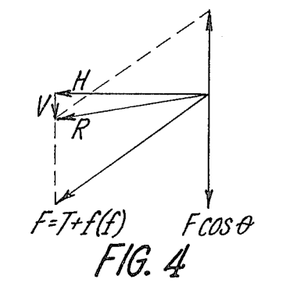
FIG. 4 is a vector diagram representing a modified diagram as illustrated in FIG. 4.
Figure 5:
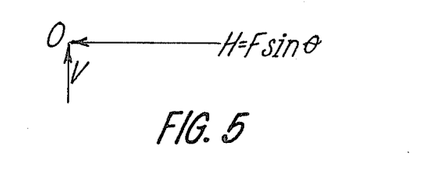
FIG. 5 is a diagram showing the components of force vectors as they are considered to operate on the turning surface.

Now referring to FIGS. 3–5, the principles of the invention are further shown, substantially as disclosed in U.S. Pat. No. 3,526,130.

FIG. 3 shows the vector forces acting on any point or surface O caused by linear material traveling thereover wherein its path is turned, i.e., the material bent on, the point or surface O and further showing tensile forces in the material itself. Under dynamic conditions a pulling means advancing linear material induces a tensile force vector F in the linear material along the direction of movement of the material away from point O as indicated. In FIG. 3 the original vertically downward path of the linear material changes or turns through an angle. Because of the force vector F, a tensile force vector T results in the linear material above the point O, i.e. provided to point O. Since there is friction at point O, the magnitude of the force vector F equals the magnitude of the force vector T plus a function of friction. The friction does not effect T, which represents tension in the material upstream or prior to the point O.

The forces acting on the point O include a force vector R, which is the resultant of the force vectors T and F. As shown in FIG. 3, the force vector R has a direction from the point O to the left and somewhat above the horizontal. The force vector R resolves into its rectangular components V and H where V is the vertical component and H is the horizontal component. Because of the direction of the force vector R, the vector component V has a direction vertically upwardly and the vector component H has a direction horizontally to the left.

Since the force vectors V and H are the rectangular components of the force vector R and R itself is the resultant force vector from the force vectors T and F, it can be seen that V and H change in magnitude together with changes in direction or magnitude of either T or F. The vectors H and V can be considered as acting on the point O as shown in FIG. 5.

While under operating conditions the direction of H remains with a direction in the horizontal to the left, the direction of V may change. For example, under certain conditions a change in the force vector F will change the direction of V. The force vector F includes in its magnitude T plus a function of friction; therefore, it is possible under conditions of large functions of friction that the vector diagram of FIG. 3 may become modified as shown in FIG. 5 where F has become so large in magnitude as to result in a force vector R having a direction extending below the horizontal. Under such conditions the vertical component V has a direction vertically downwardly. The force vector H continues to have a direction horizontally to the left; however, the magnitude of H is much greater than conditions where V is directed vertically upward. During conditions that R extends horizontally to the left, V will have zero magnitude.

From the vector diagrams of FIGS. 3 and 4 it can be seen that tensile forces, i.e. tension, in any linear material turned or bent on a point or surface O can be expressed as a relationship between the components H and V of the force vector R and the angle. The vertical component V can be stated in terms of F, T and a trigonometric function of the angle:

$$F \cos \theta = T \pm V \text{ or } \pm V = F \cos \theta - T \qquad (1)$$

Where $\theta$ is any predetermined change in the direction of linear material across the surface or point O from the original path of the material prior to the point O and component V is considered plus in the vertically upward direction and minus in the vertically downward direction. The horizontal component H can be stated in terms of the force vector F and a trigonometric function of the angle:

$$H = F \sin \theta \qquad (2)$$

When Equation 2 divided into Equation 1, one obtains:

$$F \cos \theta / F \sin \theta = (T + V)/H \qquad (3)$$

When F cancels and Equation 3 is solved for T, one obtains:

$$T = H(\cos \theta / \sin \theta) \pm V \text{ or } T = H \cot \theta \pm V \qquad (4)$$

The Equation 4 expresses the tensile force T in linear material such as the strand 1 in terms of the rectangular components (H and V) of the resultant force (R) acting upon a turning surface or point on which the linear material turns through an angle. Because H and V reflect the force vector F and the force vector F includes T plus a function of friction at the point O, the tensile force T as expressed in Equation 4 also includes the operation of friction.

Figure 6A:
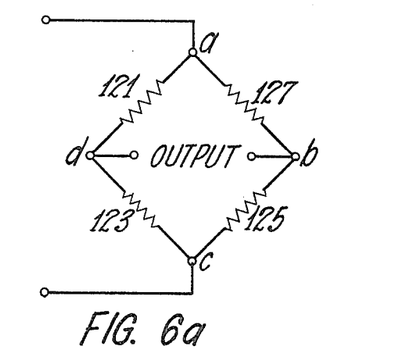
FIGS. 6a and 6b show bridge circuits for connecting the transducers to a source of excitation and for providing a signal output indicative of the tensile force.
Figure 6B:
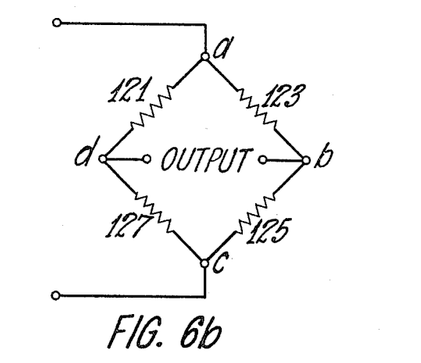

As the strand 1 turns on the shoe 15, the relationship expressed in relation to FIGS. 4 through 6 holds true the force vectors F and T in the strand 1 gives rise to rectangular components V and H of the resultant force vector R, which induce strain in the leg 12 through the leg 11. Moreover, for any given angle there is a location along the length of the leg 12 that under conditions of the strand 1 turning on the shoe 15 there are provided strains indicating T as expressed in the Equation 4. Thus, in a very real sense the invention solves the Equation 4 in terms of strain, which is read on an appropriate device as tensile force, e.g. pounds, etc.

Referring to FIG. 1, the components V and H, i.e. the resultant R of the force vectors F and T, acting on the shoe 15 as the strand 1 turns on the shoe 15 gives rise to bending moments in the leg 12. Assuming the leg 11 is a simple cantilever secured at its point of intersection with the leg 12 and the component V acts vertically upwardly as shown in FIG. 1, there is developed in leg 11 a maximum moment $M_v$ at the end connected to the leg 12 equal to V times $L_1$, where $L_1$ is the effective length of the leg 11. The FIG. 1 shows $L_1$. The bending moment $M_v$ at the end of the leg 11 is a couple that induces a constant bending moment at any point along the length of the leg 12. While the position of the application of the force vector H to the transducer 10 is the shoe 15 on the free end of the leg 11, one can consider the point of the application of the force vector H for bending moment purposes in the leg 12 to be at the intersecting end of the leg 12 as shown in FIG. 1. The bending moments caused by H in the leg 12, i.e. $M_h$, increase linearly the greater the distance away from the end of the leg 12 along the length thereof. Maximum bending moment due to H occurs at the point of securement of the leg 12 to the block 13, or in other words, at a distance $L_2$ from the point of application of the force vector H, where $L_2$ is the effective length of the leg 12.

Because flexure stresses (within proportional limits) in a cantilever are a function of force per unit area, the stress at any point along the length of the leg 12 is an expression of the bending moment at that point divided by the section modulus of the leg 12, i.e. $S = M/Z$. Hence, at any point y distance away from the block 13 along the length of the leg 12 the stress in the leg 12 is equal to $M/Z$. Since the bending moment M in the leg 12 at a location y distance from the block 13 comprises the sum of the moments due to external couples and forces caused by force vectors V and H acting on the leg 12 at the y location y distance from the block 13, one can express stress at such point as:

$$S_t = \frac{M_v + M_h}{Z} \text{ or } \frac{H(L_2 - y) + V(L_1)}{Z} \quad (5)$$

Where $S_t$ is the total stress in the leg 12 at the point y distance from the block 13, Z is the section modulus of the leg 12 and $M_v$ and $M_h$ are the bending moments at the point due to force vectors V and H respectively.

It has been determined that the stress at a point any y distance from the block 13 along the leg 12 indicates the tension T in linear material, e.g. the strand 1, provided:

$$(L_2 - y)/L_1 = \cot \theta \quad (6)$$

where $L_1$ is the effective length of the leg 11 and $L_2$ is the effective length of the leg 12. Under such conditions a comparison can be made with Equation 5, which upon moving terms can be expressed:

$$\frac{S_t Z}{L_1} = H \frac{(L_2 - y)}{(L_1)} + V \quad (7)$$

Under the conditions of $$(L_2 - y)/L_1 = \cot \theta$$

a comparison of Equation 7 with Equation 4 reveals at least the following equalities:

$$T = \frac{S_t Z}{L_1} = H \frac{(L_2 - y)}{(L_2)} + V = H \cot \theta + V \quad (8)$$

where V can be either plus or minus. Thus, it can be seen that for any given amount of turn, i.e. angle, on a surface 15 there is a location along the length of an associated member that reflects stress induced by the material by such turning wherein the induced stress indicates the tensile force T in the linear material, e.g. the linear material 1. Such location is referred to as the Tensile Force Indicator Location (TFIL). For a given $L_1$ and $L_2$, the distance y changes with a change in the angle. In practice, a fixed predetermined angle is normally employed. Note that the expression in (8), is independent of the magnitude of the friction function.

Because within the proportional limits, stress and strain are proportional, it has been convenient to use strain sensitive material or gauges positioned at the tensile force indicator location, i.e., material exhibiting a piezo resistance, to sense the strain in the leg 12 as an indicator of the magnitude of tension in linear material, e.g. the strand 1. Such material changes electrical resistivity with an applied strain, either static or dynamic. For the strain gauge material used in the preferred embodiment, the electrical resistance increases under tension and decreases under compression.

By utilizing each of the transducers 121, 123, 125 and 127 as one leg in a bridge, as shown in FIGS. 6a and 6b, it is possible to balance out the tension and compression signals produced in the transducer by the torsional force of moment C.

Referring back to FIG. 1c as shown, it can be seen that the transducer pairs 121-125 and 123-127 on leg 12 are symmetrically disposed about the neutral axis A—A'. In this case, the moment C twisting leg 12 about the neutral axis A—A' will introduce equal forces of compression in transducers 123 and 125 and equal forces of tension in transducers 121 and 127, as shown below.

| Transducer | Moments | |
|---|---|---|
| | Bending | Torsion |
| 121 | Tension | Tension |
| 123 | Compression | Compression |
| 125 | Tension | Compression |
| 127 | Compression | Tension |

Now as shown in FIG. 6a, transducers 121 and 127 under equal tension are connected at one end and connected at that end to a source of excitation. Transducers 123 and 125 under equal compression are similarly connected at one end and at that common end connected to a source of excitation. Transducer 123 is then connected at its opposite end to the opposite end of transducer 121 at point d and similarly transducer 125 is connected at its opposite end to the opposite end of transducer 127 at point b. The signal is taken from output port d-b and as stated above the excitation is provided at terminals a-c. Transducers 121 and 123 connected in adjacent legs of the bridge are in tension and compression, from torsional moment C respectively. Similarly, transducers 127 and 125 in adjacent legs of the bridge are also in tension and compression from torsional moment C respectively. These equal and opposite deflections of tension and compression produce equal and opposite changes in resistance in the legs of the bridge compensating each other and so that the balance of the bridge is unaffected by the torsional moment C and the bridge output at port d-b due to the torsional forces remains unchanged or zero.

The strain transducer is a resistance which decreases in tension and increases in compression. The decrease in resistance of transducer 121 will be the same as the decrease in resistance of transducer 127. Similarly, the increase in resistance of transducer 123 will be equal to that of the resistance of transducer 125. The resistance changes in the transducers due to the effect of tension about principle axis A—A' will produce voltage drops along the path a-d and d-c equal to the voltage drops along the path a-b and b-c. Accordingly, the bridge will be in balance and the voltage across points d-b will be zero due to the torsional stress and no signal will be produced by the change in resistance of the transducers due to torsion. However, the bending moment B about the fixed point 13 will decrease resistance 121 and 125 while increasing resistance 123 and 127 so that the voltage drops along legs a-d and d-c will be different from that along a-b and b-c producing a change in voltage across the output point d-b.

Accordingly, the only signal present at output point d-b will be the signal produced by the bending moment B about the support 13.

An alternate way of connecting the transducers on the bridge is shown in FIG. 6b wherein transducer 123 is connected in common with transducer 121 and at that common point to a source of excitation and transducers 125 and 127 are connected in common and at that common point to a source of excitation and with the signal output point taken between the common connections of transducers 127 and 121, terminal d and transducers 123 and 125, terminal b.

As shown above, the bending B moment produces tension in transducer 121, tension in transducer 125, compression in transducer 123, and compression in transducer 127. The torsion moment C produces tension in transducer 121, compression in transducer 125. compression in transducer 123 and tension in transducer 127. As can be seen with regard to the bridge arrangement of FIG. 6b, the effect of the torsion moment C produces a decrease in the resistance of transducers 121 and 127 located on adjacent legs of the bridge which decreases the total resistance of the path a-d-c. The effect of the bending moment C on transducers 123 and 125 produces an increase in the resistance of the transducers and an increase in the resistance of path a-b-c. However, an equal amount of tension is applied to transducer 121 as is applied to 127 and an equal amount of compression is applied to transducer 123 as is applied to 125. The resistance of the transducers in each parallel path a-d-c and a-b-c change proportionally. As is known, the voltage drop across a resistance in a series path with respect to the voltage is proportional to that resistance with respect to the total resistance in that series path. As both the resistances 121 and 127 change proportionally, the voltage drop across each resistance does not change so that the voltage appearing at point d remains the same. Similarly, as both the resistance of transducers 123 and 125 change proportionally, the voltage drops across each transducer does not change and the voltage at terminal b remains the same. The bridge then remains in balance as before the torsion moment C was applied about the axis A—A'. No signal voltage appears across terminals d-b due to the effect of torsion.

However, the effect of the bending moment B about the fixed end 13 will cause a decrease in resistance of transducer 121 and a decrease in resistance of transducer 125 while increasing the resistance in transducers 123 and 127 producing an unbalanced bridge and a signal output across output terminals d to b responsive to the bending moment B.

An alternative arrangement is shown in FIGS. 2a and 2b. FIG. 2a shows a side view of an alternative embodiment for the apparatus while the same apparatus is shown in perspective view in FIG. 2b. The same parts operating in substantially the same manner as in FIGS. 1a, b, and c, are identified by the same part numbers.

The device as illustrated is identified generally by the numeral 20 and includes a single arm 12 supported in cantilevered fashion from support 13. A first face 17 has supported thereon transducers 121 and 125 symmetrically arranged around the neutral axis or longitudinal axis A—A'. While on the opposite face 16 as are arranged transducers 123 and 127 symmetrically around a neutral axis. A cross section of the arm 12 as shown in FIG. 3c to better illustrate the manner in which the transducers 121 through 127 are arranged on arm 12.

As shown in FIG. 2a and 2b, the continuous strand 1 is bent against the arm 12 at means 15 which has a similar construction to means 15 in FIGS. 1 and 2 and illustrated as rod 15. The continuous strand 1 bent around the rod 15 through an angle which imparts a bending moment B about axis through the support 13 and additionally imparts a torsional moment C about the neutral axis A—A'. The angle of bend may be controlled by the location of the collection position such as the winder (not shown). Turning the strand 1 through an angle on the rod 15 produces two force vectors V and H acting on the turning surface. The force vector V acts longitudinally on arm 12 to either compress arm 12 or subject to tension depending upon the direction of the force vector V. The operation of the force vector H produces flexure stresses in arm 12. The stresses in arm 12 or a combination of the flexure stress from the force vector H and either compression or tension stress from the force vector V. The stresses in the arm 12 at a point y at a distance from support 13 can be expressed as:

$$S_t = S_h + S_v = (Mh/Z) \pm (V/A) \text{ or } (Mh/Z) \pm (dV/6Z) \qquad (9)$$

Where $S_t$ is the total stress at the point y, z is the section modulus of the arm 12, and $M_h$ is the bending moment of the arm 12 of the point y distance from the secured end 13 of the arm 12 and A is the transverse cross-sectional area of the arm 12 which can be expressed as 6z/d and where d is the thickness of the arm 12. When terms are substituted, equation 9 can be stated as:

$$S_t = \frac{H}{Z}(L-y) \pm \frac{dV}{6Z} \text{ ir } S_t \frac{6Z}{d} = 6H(L-y) \pm V \qquad (10)$$

where L is the effective length of the arm 12 as shown in FIGS. 2a 2b.

The stress at any point y distance from the secured end of the arm 12 indicates the tension T and the strand 1 provided $$6(L-y) = \cot\theta \qquad (11)$$

Under such conditions Equation 10 can be compared with Equation 4 in at least the following equalities expressed:

$$T = S_t(6Z/d) = H[6(L-y)] \pm V = H\cot\theta \pm V \qquad (12)$$

where V can be plus or minus.

For any angle of bend or turn of the material 1 about the rod 15, there then exists a location along the length of the arm 12 operably associated with the surface wherein the induced stress imparted by turning of the material 1 against arm 15 indicates the tensile force T in the linear material. As in the embodiment shown in FIGS. 1 and 2, this is the Tensile Force Indicator Location (TFIL). Within proportional limits, stress is proportional to strain and is employed as an indicator of tensile force in the linear material 1. For a given L and 6(L=y), the Tensile Force Indicator Location changes with changes in the angle. In practice, a fixed predetermined angle is normally employed for ease in the use and location of strain transducers 121 through 127.

The embodiments shown in FIGS. 1a, b, c and in FIGS. 2a and 2b can be used with a strand made of a plurality of fibers gathered at the means 15 for engaging the filaments.

It should be recognized that while particular embodiments are shown for use with this device, many embodiments can be made according to the principles of the invention and the invention should not be thought of as limited by the particular embodiments shown.

I claim:

1. An apparatus for measuring tension in linearly extended flexible material, said apparatus comprising: (a) a support means; (b) a first member having one end attached to said support means; (c) means associated with said first member for engaging tensioned material to impart a bend thereto, thereby causing strain in said first member, said strain being produced by first and second moments, said first and second moments being separate moments; and (d) means for sensing said strain caused in said first member by only said first moment and for generating a signal responsive thereto as an indication of the tension in said material.

2. An apparatus as recited in claim 1, wherein said engaging means comprises a second member projecting from said first member and a rod attached to said second member.

3. An apparatus as recited in claim 2, wherein said strain sensing and signal generating means comprises a plurality of strain transducers positioned on said first member at a distance from the intersection of said first member with said second member such that the ratio of said distance to the length of said second member is equal to the cotangent of the angle between said material after said bend and the straight line projection of said material before said bend.

4. An apparatus as recited in claim 1, wherein said engaging means comprises a rod attached to said first member.

5. An apparatus as recited in claim 1, wherein said first and second moments act about two separate axes, with each of said axes passing through said support means.

6. An apparatus as recited in claim 1, wherein said strain sensing and signal generating means comprises a plurality of strain transducers mounted on said first member about a netural axis passing between said transducers on said first member, said strain transducers generating a signal indicative of the strain sensed thereby, said material describing a first plane with said first plane being nonintersecting with said neutral axis.

7. An apparatus as recited in claim 6, wherein said strain sensing and signal generating means further comprises a bridge circuit with said strain transducers being connected in said bridge circuit such that the signals generated by said strain transducers responsive to said first moment are unbalanced and the signals generated by said strain transducers responsive to said second moment are balanced.

8. An apparatus as recited in claim 7, wherein two of said strain transducers are mounted on a first side of said first member and two of said strain transducers are mounted on a second side of said first member, said second side being opposite said first side, and said bridge circuit has opposite and adjacent legs with each of said strain transducers mounted on the same side of said first member being connected in opposite legs of said bridge circuit.

9. An apparatus as recited in claim 8, wherein said strain transducers mounted on said first side of said first member are mounted symmetrically about said neutral axis and said strain transducers mounted on said second side of said first member are mounted symmetrically about said neutral axis.

10. An apparatus as recited in claim 8, wherein said bridge circuit comprises a first of said strain transducers on said first side connected to a second of said strain transducers on said second side, a third of said strain transducers on said first side connected to a fourth of said strain transducers on said second side, each of said connections being adapted to be connected to a source of excitation and a signal output port having a first terminal connected to said first and fourth strain transducers and a second terminal connected to said second and third strain transducers.

11. An apparatus as recited in claim 10, wherein said first and second strain transducers are under tension from said second moment.

12. An apparatus as recited in claim 10, wherein said first and second strain transducers are under tension and compression, respectively, from said second moment.

13. An apparatus as recited in claim 10, wherein said first and fourth strain transducers are positioned on the same side of said neutral axis.

14. An apparatus as recited in claim 10, wherein said first and fourth strain transducers are positioned on opposite sides of said neutral axis.

* * * * *

UNITED STATES PATENT AND TRADEMARK OFFICE
CERTIFICATE OF CORRECTION

PATENT NO. : 4,233,837
DATED : November 18, 1980
INVENTOR(S) : Sheldon A. Canfield It is certified that error appears in the above-identified patent and that said Letters Patent are hereby corrected as shown below:

Column 10, line 45 - The equation should read as follows:

$$S_t = \frac{H}{Z}(L-y) \pm \frac{dV}{6Z} \text{ or } S_t \frac{6Z}{d} = 6H(L-y) \pm V$$

Column 11, line 4 - The equation should read as follows:

$$6(L-y)$$

Signed and Sealed this

Thirty-first Day of March 1981

[SEAL]

Attest:

RENE D. TEGTMEYER

Attesting Officer

Acting Commissioner of Patents and Trademarks